March 25, 1969 H. B. CARY Re. 26,549

ARC WELDING WITH A.C. POWER AND CORED ELECTRODE

Original Filed May 12, 1965

INVENTOR.
HOWARD B. CARY
BY
Marechal, Biebel, French & Bugg
ATTORNEYS

United States Patent Office

Re. 26,549
Reissued Mar. 25, 1969

26,549
ARC WELDING WITH A.C. POWER AND CORED ELECTRODE

Howard B. Cary, Troy, Ohio, assignor to Hobart Brothers Company, Troy, Ohio, a corporation of Ohio Original No. 3,309,490, dated Mar. 14, 1967, Ser. No. 540,788, Mar. 14, 1966, which is a continuation of Ser. No. 455,188, May 12, 1965, now abandoned, which in turn is a continuation-in-part of Ser. No. 246,916, Dec. 26, 1962, now abandoned. Application for reissue Aug. 23, 1967, Ser. No. 663,458
Int. Cl. B23k *7/16, 35/38*
U.S. Cl. 219—74 17 Claims

Matter enclosed in heavy brackets [ ] appears in the original patent but forms no part of this reissue specification; matter printed in italics indicates the additions made by reissue.

This application is a continuation of application Ser. No. 455,188, filed May 12, 1965, now abandoned, which in turn is a continuation-in-part of application Ser. No. 246,916, filed Dec. 26, 1962, now abandoned, and assigned to the same assignee as the present application.

This invention relates to arc welding and more particularly to a gas shielded arc welding device and process utilizing commercially available alternating current electrical power and a continuous cored electrode containing slag forming and deoxidizing materials and including ionizing agents that promote conductivity to aid in maintaining arc ignition during current reversal and during periods of momentary short circuit. The device constructed according to this invention is particularly useful in welding heavy materials where the welding current required is in the range of from 500 to 1500 amperes.

It has previously been proposed to use cored electrode in direct current welding to provide a slag shield for the molten weld material. This slag shield excluded air from the molten weld and prevented oxidation and nitrating of the hot weld metal. It has also been proposed to use a gas shield in the area around the arc to exclude the air from the weld in the area in which the slag has not yet formed on the surface.

This gas shielded welding technique was particularly useful in direct current welding since a stable arc could be maintained. However, when welding heavy pieces which require extremely high welding currents, large magnetic fields are concentrated around the arc which cause serious problems especially at the end of the welding operation. At the end of a work piece, the magnetic field becomes distorted and due to the high intensity of this field arc and the molten metal will be blown away from the end of the work piece thus preventing the welding operation from being completed. Various means have been suggested to correct this problem in high intensity direct current welding including the addition of attachments which have been designed to counteract the magnetic field. These corrective measures, however, all add to the cost and reduce the efficiency of the welding operation.

The use of alternating currents has been suggested for high current welding operations since the problem of magnetic blow is materially reduced. With alternating currents, however, it has been difficult to provide a stabilized arc and thus a satisfactory weld. This is due in part to the extinguishing of the arc each time the current reverses polarity. Attempts to stabilize the arc and to insure re-ignition after current reversal have included techniques in submerged arc welding where a welding composition or flux is placed between the electrode and the work piece. The flux becomes conductive when heated and thus aids in maintaining the current flow.

It has also been suggested to use high open circuit voltages, for example, over 100 volts, in order to quickly reestablish the arc and to incorporate on the welding electrode an emissive coating to create an ionized atmosphere between the electrode and the article being welded to aid in reestablishing the arc after current reversal.

The obvious disadvantages of the submerged arc welding process is the lack of visibility of the joint during welding, and the problem of holding the welding composition against the work piece if in other than a horizontal position. The welding compositions or flux must also be perfectly dry which requires favorable weather conditions in open air operations.

The use of high open circuit voltage is hazardous especially in manual or semi-automatic operations where the operator handles one of the current carrying elements. Further, the addition of substances which function to assist the metal transfer from the consumable electrode to the work piece necessitates providing a continuous feeding of the substances in a finely divided state into the welding arc. This not only requires special means but increases the cost of the welding operation and tends to lower efficiency.

The present invention contemplates using commercial frequency (i.e., in most cases 50-cycle or 60-cycle) alternating current electrical power which is converted into a low voltage and a high current source by a suitable transformer. A sufficient inductive reactance to maintain an adequate phase angle between the current and the *applied* voltage to insure the reestablishment of the arc immediately after current reversal is placed between the welding electrode and the transformer. The voltage versus current characteristics of the entire power supply is designed to insure a stabilized arc and to minimize splatter from the electrodes.

The apparatus constructed according to the present invention further contemplates using a commercially available corded electrode containing slag forming and deoxidizing materials and ionizing agents. An air excluding gas shield is also provided to protect the molten metal in the weld from the harmful effects of nitrogen and oxygen in the air until the protective slag is formed.

Accordingly, it is an object of the invention to provide an electrical arc welding apparatus and method of arc welding capable of using commercially available alternating current power sources, an air excluding shield gas and a continuous cored electrode.

It is another object of this invention to provide an alternating current electrical arc welding apparatus useful in the high intensity current ranges which reduces the effect of magnetic blow.

It is another object of this invention to provide a welding apparatus employing alternating current where the electrode is continuously fed into the arc at a feed rate related to the desired deposition rate of the weld.

A further object of the invention is to provide novel arc welding electrodes for use with alternating current welding apparatus.

Other objects and advantages of the invention will be apparent from the following description, the accompanying drawings and the appended claims.

Figure 1:
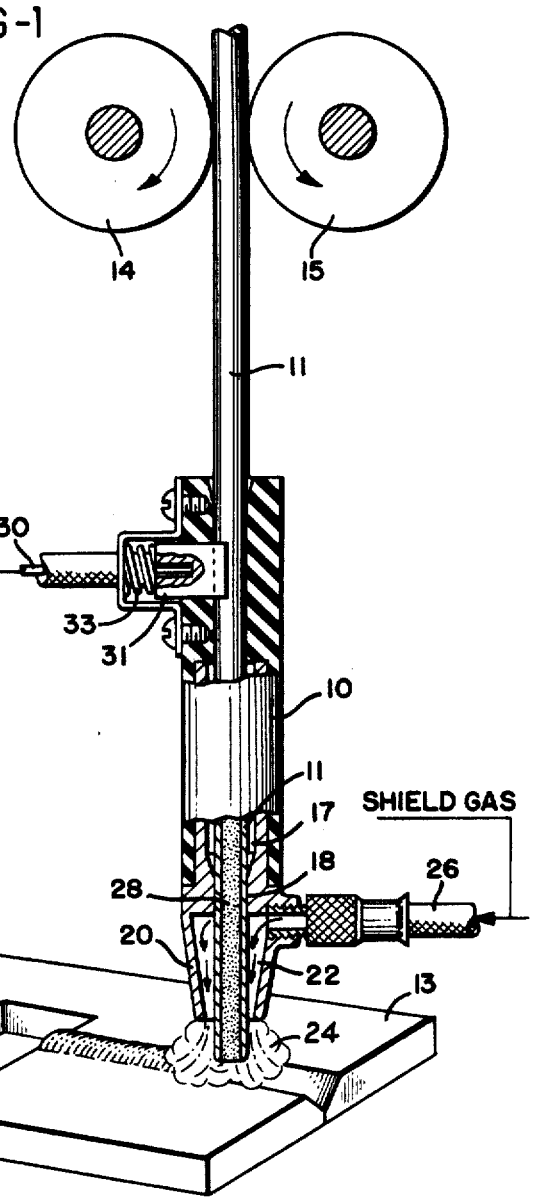
FIG. 1 is a view in elevation, partly in perspective and partly in section of a suitable welding apparatus as constructed in this invention with an A.C. electrical power supply therefor shown schematically.

In FIG. 1 a welding head 10 is shown feeding a continuous, consumable cored electrode 11 through the head 10 to the work piece 13 by friction rolls 14 and 15. The feed rate of the electrode is determined by the desired deposition rate of the weld. Suitable drives for the rolls 14 and 15 are well known.

The welding head 10 comprises a hollow body portion 17 having a central passageway 18 for passage of the cored electrode 11. An integral nozzle 20 on the lower end of the welding head includes a nozzle chamber 22 which receives shielding gas for discharge from the nozzle around the electrode to provide a gas shield at the arc end as shown at 24.

A conduit 26 which is suitably connected to the welding head communicates with a source of shielding gas, such as carbon dioxide, argon, helium, or mixtures thereof, and which may include up to five percent by volume of oxygen. Introduction of the gas into the nozzle as indicated by the arrows will cause the gas to exclude the air around the arc and thus form a shield at the weld to promote purity of the weld.

The electrode 11 comprises a hollow tube of metal, such as mild steel, which is filled with slag forming and deoxidizing materials 28 and may include an ionizing agent. Alternating current is supplied to the electrode through wire 30 and a metal contact shoe 31. The contact shoe is yieldably held in sliding engagement with electrode 11 by coil spring 33. The circuit is completed by wire 35, normally referred to as a ground wire, electrically connected to work piece 13 through contact 36.

The alternating current for the welding apparatus may be supplied, for example, from a suitable transformer 40. The primary winding 41 of transformer 40 may be connected to a source of commercial alternating current. One side of secondary winding 42 is connected to the work piece 13 through wire 35. An inductive reactance 43 is placed between the electrode and secondary winding 42. The inductive reactance 43 acts to insure the continuous reestablishment of the arc after current reversal or each time the current passes through zero, and preferably is adjustable to provide for a stable arc over a wide range of welding currents.

The power supply constructed according to this invention gives a controlled current output that insures a proper weld. When a short circuit occurs between the electrode 11 and the article 13 being welded, as due to a drop of metal therebetween, the current output from the power supply increases an amount sufficient to melt the electrode and move the drop into the weld. The current does not increase to a value which would cause the molten metal to explode resulting in splatter.

Figure 2:
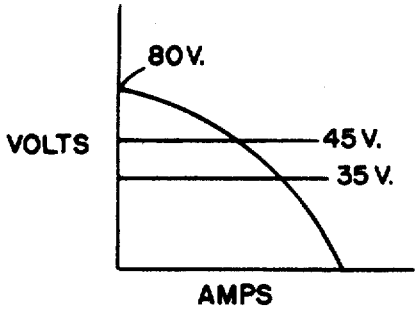
FIG. 2 is a curve showing the relationship between the voltage and current at the output of the power supply.

FIG. 2 shows a typical voltage versus curves of the power supply of this invention. The open circuit voltage may be, for example, 80 volts, while the usable voltage range may be between 35 and 45 volts. Under normal welding conditions, the voltage across the arc may be 45 volts. However, during a momentary short circuit, the voltage would decrease, and the current increase an amount large enough to melt the metal, but not large enough to produce splatter.

Figure 3:
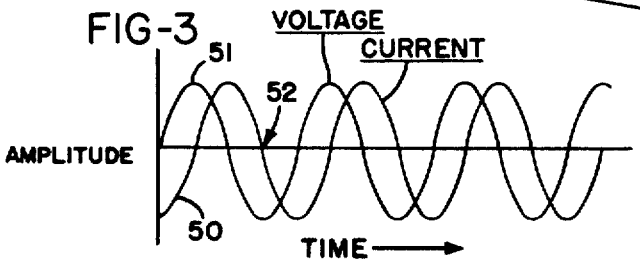
FIG. 3 is a chart showing the phase relationship of the voltage and current in the welding circuit with respect to time.

FIG. 3 shows the phase relationship between the *applied* voltage and the current at the arc. Line 50 represents the current and line 51 represents the *applied* voltage *at the terminals of the transformer secondary winding 42* [across the arc]. The arc is extinguished when the current passes through zero and reverses direction as at 52. Since the *applied* voltage leads the current as shown by the curves, the voltage will already be at a substantial magnitude at the time the arc is extinguished and will thus aid in the reestablishment of the arc.

The composition used in the cored electrode contains as essential constituents oxides and silicates of potassium or titanium, deoxidizers such as manganese, silicon or titanium, and some also contain a fluoride such as cryolite, potassium, silica fluoride, and calcium fluoride. Suitable compositions useful for application to the welding through the core of electrodes are given in the following tables:

Compositions for cored electrodes

TABLE I

| | Parts by weight |
|---|---|
| Manganese | 16 |
| Ferrosilicon | 14 |
| Titanium dioxide (rutile) | 55 |
| Ferric oxide (magnetite) | 15 |

TABLE II

| | Parts by Weight | Range |
|---|---|---|
| Potassium Titanate | 45 | 40–50 |
| Ferromanganese | 18 | 15–25 |
| Ferrosilicon | 14 | 12–16 |
| Iron (60 mesh powder) | 8 | 6–10 |
| Ferric Oxide (Magnetite) | 15 | 12–20 |

TABLE III

| | Parts by Weight | Range |
|---|---|---|
| Potassium Titanate | 20 | 16–25 |
| Ferromanganese | 22 | 18–24 |
| Ferrosilicon | 17 | 15–20 |
| Aluminum Silicate (Kyanite) | 10 | 8–12 |
| Titanium Dioxide (Rutile) | 11 | 8–13 |

TABLE IV

| | Parts by Weight | Range |
|---|---|---|
| Potassium Titanate | 30 | 20–40 |
| Ferromanganese | 25 | 15–45 |
| Ferrosilicon | 15 | 12–25 |
| Ferric Oxide (Magnetite) | 15 | Trace–20 |

TABLE V

| | Parts by Weight | Range |
|---|---|---|
| Potassium Silicate | 20 | 15–30 |
| Titanium Dioxide | 30 | 20–40 |
| Ferromanganese | 25 | 20–40 |
| Ferrosilicon | 10 | 5–15 |
| Sodium aluminum fluoride (Cryolite) | 10 | 8–14 |
| Calcium fluoride (Fluorspar) | 3 | 2–5 |

TABLE VI

| | Parts by Weight | Range |
|---|---|---|
| Potassium Silicate | 25 | 15–30 |
| Titanium Dioxide | 30 | 20–40 |
| Ferromanganese | 15 | 20–40 |
| Ferrosilicon | 10 | 5–15 |
| Ferrotitanium | 0 | Trace–10 |
| Iron | 0 | Trace–30 |

TABLE VII

| | Parts by Weight | Range |
|---|---|---|
| Potassium Titanate | 30 | 20–40 |
| Ferromanganese | 20 | 15–45 |
| Ferrosilicon | 15 | 12–25 |
| Iron Oxide | 0 | Trace–20 |

TABLE VIII

| | Parts by Weight | Range |
|---|---|---|
| Rubidium Carbonate | 5 | 4–8 |
| Titanium Dioxide | 20 | 17–35 |
| Ferromanganese | 18 | 15–40 |
| Ferrosilicon | 15 | 12–25 |
| Iron Oxide | 0 | Trace–20 |

TABLE IX

| | Parts by Weight | Range |
|---|---|---|
| Cesium Carbonate | 8 | 4–17 |
| Titanium Dioxide | 18 | 17–35 |
| Ferromanganese | 25 | 20–40 |
| Ferrosilicon | 10 | 5–15 |
| Ferro-zirconium | 0 | Trace–10 |
| Iron Oxide | 0 | Trace–30 |

In the foregoing electrode compositions, manganese, silicon and titanium are deoxidizers. The fluorides promote fusion. The compounds of potassium, titanium, cesium and rubidium are ionizing agents and function to promote the restoration of welding currents immediately after current reversal. It is possible to include the deoxidizers in the mild steel sheath or tube instead of as a part of the core material.

The cored electrode comprises from 12 to 18 percent by weight of core material. The outer sheath of the metal electrode may be composed of a mild steel containing approximately 0.10 percent carbon, 0.32–0.60 percent manganese and 0.04 percent silicon.

In accordance with one embodiment of the invention, the welding process is carried out with an arc created by an alternating current power supply having an open circuit voltage of between 50 and 80 volts. The current supplied to the weld is between 500 and 1500 amperes. Air is eliminated from the weld by supplying a shielding gas of carbon dioxide, argon or helium, or mixtures thereof, to the arc region at approximately ten to sixty-five cubic feet per hour through the nozzle described.

To weld a one inch thick plate of mild steel, for example, a ⅛ inch electrode composed of a mild steel outer sheath and a core composition as described in Table I may be used. With an open circuit voltage of 72 volts, the current drawn during the welding operation will be approximately 800 amperes and the voltage across the arc will be approximately 40 volts.

The apparatus and process described is particularly useful for large current welding requirements, such as in the range from 500 to 1500 amperes. The use of alternating electrical current with the phase angle between the current and voltage cotnrolled, and the use of a shielding gas permits high current welding without requiring that the arc be submerged in a powdered or granulated welding composition.

While the process herein described, and the form of apparatus for carrying this process into effect, constitute a preferred embodiment of the invention, it is to be understood that the invention is not limited to this precise process and form of apparatus, and that changes may be made in either without departing from the scope of the invention which is defined in the appended claims.

What is claimed is:

1. An arc welding electrode for welding steel by an arc created by an alternating current power supply, said electrode consisting of a metallic tube filled with a composition comprising by weight 20 to 40 parts of potassium titanate, 15 to 45 parts of ferromanganese, 12 to 25 parts of ferrosilicon, and a trace to 20 parts of iron oxide.

2. An arc welding electrode as defined in claim 1 wherein the iron oxide is ferric oxide.

3. An arc welding electrode for welding steel by an arc created by an alternating current power supply, said electrode consisting of a metallic tube filled with a composition comprising by weight 40 to 50 parts potassium titanate, 15 to 25 parts ferromanganese, 12 to 16 parts ferrosilicon, 12 to 20 parts ferric oxide, and 6 to 10 parts iron powder.

4. An arc welding electrode for welding by an arc created by an alternating current power supply, said electrode consisting of a metallic tube filled with a composition comprising by weight 16 to 25 parts of potassium titanate, 18 to 24 parts ferromanganese, 15 to 20 parts ferrosilicon, 8 to 12 parts aluminum silicate, and 8 to 13 parts titanium dioxide.

5. An arc welding electrode for welding by an arc created by an alternating current power supply, said electrode consisting of a metallic tube filled with a composition comprising by weight 15 to 30 parts potassium silicate, 20 to 40 parts titanium dioxide, 20 to 40 parts ferromanganese, 5 to 15 parts ferrosilicon, 8 to 14 parts sodium aluminum fluoride, and 2 to 5 parts calcium fluoride.

6. An arc welding electrode for welding by an arc created by alternating current power supply, said electrode consisting of a metallic tube filled with a composition comprising by weight 15 to 30 parts of potassium silicate, 20 to 40 parts of titanium dioxide, 20 to 40 parts of ferromanganese, 5 to 15 parts of ferrosilicon, a trace to 10 parts of ferrotitanium, and a trace to 30 parts of iron.

7. An arc welding electrode for welding by an arc created by an alternating current power supply, said electrode consisting of a metallic tube filled with a composition comprising by weight 4 to 8 parts of rubidium carbonate, 17 to 35 parts of titanium dioxide; 15 to 49 parts of ferromanganese, 12 to 25 parts of ferrosilicon and 0 to 20 parts of iron oxide.

8. An arc welding electrode for welding by an arc created by an alternating current power supply, said electrode consisting of a metallic tube filled with a composition comprising by weight 4 to 17 parts of cesium carbonate, 17 to 35 parts of titanium dioxide, 20 to 40 parts of ferromanganese, 5 to 15 parts of ferrosilicon, 0 to 10 parts of ferrozirconium, and 0 to 30 parts of iron oxide.

9. A process of electric arc welding with an open arc which comprises the steps of supplying an alternating electric current at commercial frequency and in the order of at least 500 amperes to a continuous consumable cored electrode connected in series wtih an inductive reactance to develop an arc between the said electrode and an article being welded, said inductive reactance being the major element affecting the application of electrical power from the alternating current source to the arc and being of sufficient reactance to cause the current flowing through the arc to lag the *applied* voltage [applied between the electrode and the article] by an amount sufficient to establish a sufficient open circuit voltage across the arc when the current is essentially zero to reestablish the arc immediately after current reversal solely under promotion of the available open circuit voltage and the action of ionizing agent present in the core material of the electrode, adjusting the reactance to adjust the phase angle between the voltage and the current to an amount sufficient to create and maintain a stabilized arc, employing an electrode comprising a tubular metallic sheath and core material contained therein in the amount of from 12 to 18 percent by weight of the total weight of the electrode and including an ionizing agent as an essential ingredient, the core material consisting of 16 parts by weight of manganese, 14 parts by weight of ferrosilicon, 55 parts by weight of rutile, and 15 parts by weight of magnetite, feeding the electrode toward the article being welded at a rate sufficient to maintain continuous welding at the arc and simultaneously causing relative motion between [an] *the* arc and the electrode along a desired line of weld, and directing an inert [arc] *air* excluding shield of gas toward the article and around the arc.

10. A process of electric arc welding with an open arc which comprises the steps of supplying an alternating electric current at commercial frequency and in the order of at least 500 amperes to a continuous consumable cored electrode connected in series with an inductive reactance to develop an arc between the said electrode and an article being welded, said inductive reactance being the major element affecting the application of electrical power from the alternating current source to the arc and being of sufficient reactance to cause the current flowing through the arc to lag the *applied* voltage [applied between the electrode and the article] by an amount sufficient to establish a sufficient open circuit voltage across the arc when the current is essentially zero to reestablish the arc immediately after current reversal solely under promotion of the available open circuit voltage and the action of ionizing agent present in the core material of the electrode, adjusting the reactance to adjust the phase angle between the voltage and the current to an amount sufficient to create and maintain a stabilized arc, employing an electrode comprising a tubular metallic sheath and core material contained therein in the amount of from 12 to 18 percent by weight of the total weight of the electrode and including an ionizing agent as an essential ingredient, the core material consisting of 20 to 40 parts by weight of potassium titanate, 15 to 45 parts by weight of ferromanganese, 12 to 25 parts by weight of ferrosilicon, and a trace to 20 parts by weight of iron oxide, feeding the electrode toward the article being welded at a rate sufficient to maintain continuous welding at the arc and simultaneously causing relative motion between [an] *the* arc and the electrode along a desired line of weld, and directing an inert air excluding shield of gas toward the article and around the arc.

11. The process as defined in claim 10 wherein the iron oxide in the core material of the electrode is ferric oxide.

12. A process of electric arc welding with an open arc which comprises the steps of supplying an alternating electric current at commercial frequency and in order of at least 500 amperes to a continuous consumable cored electrode connected in series with an inductive reactance to develop an arc between the said electrode and an article being welded, said inductive reactance being the major element affecting the application of electrical power from the alternating current source to the arc and being of sufficient reactance to cause the current flowing through the arc to lag the *applied* voltage [applied between the electrode and the article] by an amount sufficient to establish a sufficient open circuit voltage across the arc when the current is essentially zero to reestablish the arc immediately after current reversal solely under promotion of the available open circuit voltage and the action of ionizing agent present in the core material of the electrode, adjusting the reactance to adjust the phase angle between the voltage and the current to an amount sufficient to create and maintain a stabilized arc, employing an electrode comprising a tubular metallic sheath and core material contained therein in the amount of from 12 to 18 percent by weight of the total weight of the electrode and including an ionizing agent as an essential ingredient, the core material consisting of 40 to 50 parts by weight of potassium titanate, 15 to 25 parts by weight of ferromanganese, 12 to 16 parts by weight of ferrosilicon, 12 to 20 parts by weight of ferric oxide, and 6 to 10 parts by weight of iron powder, feeding the electrode toward the article being welded at a rate sufficient to maintain continuous welding at the arc and simultaneously causing relative motion between [an] *the* arc and the electrode along a desired line of weld, and directing an inert air excluding shield of gas toward the article and around the arc.

13. A process of electric arc welding with an open arc which comprises the steps of supplying an alternating electric current at commercial frequency and in the order of at least 500 amperes to a continuous consumable cored electrode connected in series with an inductive reactance to develop an arc between the said electrode and an article being welded, said inductive reactance being the major element affecting the application of electrical power from the alternating current source to the arc and being of sufficient reactance to cause the current flowing through the arc to lag the *applied* voltage [applied between the electrode and the article] by an amount sufficient to establish a sufficient open circuit voltage across the arc when the current is essentially zero to reestablish the arc immediately after current reversal solely under promotion of the available open circuit voltage and the action of ionizing agent present in the core material of the electrode, adjusting the reactance to adjust the phase angle between the voltage and the current to an amount sufficient to create and maintain a stabilized arc, employing an electrode comprising a tubular metallic sheath and core material contained therein in the amount of from 12 to 18 percent by weight of the total weight of the electrode and including an ionizing agent as an essential ingredient, the core material consisting of 16 to 25 parts by weight of potassium titanate, 18 to 24 parts by weight of ferromanganese, 15 to 20 parts by weight of ferrosilicon, 8 to 12 parts by weight of aluminum silicate, and 8 to 13 parts by weight of titanium dioxide, feeding the electrode toward the article being welded at a rate sufficient to maintain continuous welding at the arc and simultaneously causing relative motion between [an] *the* arc and the electrode along a desired line of weld, and directing an inert air excluding shield of gas toward the article and around the arc.

14. A process of electric arc welding with an open arc which comprises the steps of supplying an alternating electric current at commercial frequency and in the order of at least 500 amperes to a continuous consumable cored electrode connected in series with an inductive reactance to develop an arc between the said electrode and an article being welded, said inductive reactance being the major element affecting the application of electrical power from the alternating current source to the arc and being of sufficient reactance to cause the current flowing through the arc to lag the *applied* voltage [applied between the electrode and the article] by an amount sufficient to establish a sufficient open circuit voltage across the arc when the current is essentially zero to reestablish the arc immediately after current reversal solely under promotion of the available open circuit voltage and the action of ionizing agent present in the core material of the electrode, adjusting the reactance to adjust the phase angle between the voltage and the current to an amount sufficient to create and maintain a stabilized arc, employing an electrode comprising a tubular metallic sheath and core material contained therein in the amount of from 12 to 18 percent by weight of the total weight of the electrode and including an ionizing agent as an essential ingredient, the core material consisting of 15 to 30 parts by weight of potasium silicate, 20 to 40 parts by weight of titanium dioxide, 20 to 40 parts by weight of ferromanganese, 5 to 15 parts by weight of ferrosilicon, 8 to 14 parts by weight of sodium aluminum fluoride, and 2 to 5 parts by weight of calcium fluoride, feeding the electrode toward the article being welded at a rate sufficient to maintain continuous welding at the arc and simultaneously causing relative motion between [an] *the* arc and the electrode along a desidered line of weld, and directing an inert air excluding shield of gas toward the article and around the arc.

15. A process of electric arc welding with an open arc which comprises the steps of supplying an alternating electric current at commercial frequency and in the order of at least 500 amperes to a continuous consumable cored electrode connected in series with an inductive reactance to develop an arc between the said electrode and an article being welded, said inductive reactance being the major element affecting the application of electrical power from the alternating current source to the arc and being of sufficient reactance to cause the current flowing through the arc to lag the *applied* voltage [applied between the electrode and the article] by an amount sufficient to establish a sufficient open circuit voltage acros the arc when the current is essentially zero to reestablish the arc immediately after current reversal solely under promotion of the available open circuit voltage and the action of ionizing agent present in the core material of the electrode, adjusting the reactance to adjust the phase angle between the voltage and the current to an amount sufficient to create and maintain a stabilized arc, employing an electrode comprising a tubular metallic sheath and core material contained therein in the amount of from 12 to 18 percent by weight of the total weight of the electrode and including an ionizing agent as an essential ingredient, the core material consisting of 15 to 30 parts by weight of potassium silicate, 20 to 40 parts by weight of titanium dioxide, 20 to 40 parts by weight of ferromanganese, 5 to 15 parts by weight of ferrosilicon, a trace to 10 parts by weight of ferrotitanium and a trace to 30 parts by weight of iron, feeding the electrode toward the article being welded at a rate sufficient to maintain continuous welding at the arc and simultaneously causing relative motion between [an] *the* arc and the electrode along a desired line of weld, and directing an inert air excluding shield of gas toward the article and around the arc.

16. A process of electric arc welding with an open arc which comprises the steps of supplying an alternating electric current at commercial frequency and in the order of at least 500 amperes to a continuous consumable cored electrode connected in series with an inductive reactance to develop an arc between the electrode and an article being welded, said inductive reactance being the major element affecting the application of electrical power from the alternating current source to the arc and being of sufficient reactance to cause the current flowing through the arc to lag the *applied* voltage [applied between the electrode and the article] by an amount sufficient to establish a sufficient open circuit voltage across the arc when the current is essentially zero to reestablish the arc immediately after current reversal solely under promotion of the available open circuit voltage and the reaction of ionizing agent present in the core material of the electrode, adjusting the reactance to adjust the phase angle between the voltage and the current to an amount sufficient to create and maintain a stabilized arc, employing an electrode comprising a tubular metallic sheath and core material contained therein in the amount of from 12 to 18 percent by weight of the total weight of the electrode and including an ionizing agent as an essential ingredient, the core material consisting of 4 to 8 parts by weight of rubidium carbonate, 17 to 35 parts by weight of titanium dioxide, 15 to 49 parts by weight of ferromanganese, 12 to 25 parts by weight of ferrosilicon, and a trace to 20 parts by weight of iron oxide, feeding the electrode toward the article being welded at a rate sufficient to maintain continuous welding at the arc and simultaneously causing relative motion between [an] *the* arc and the electrode along a desired line of weld, and directing an inert air excluding shield of gas toward the article and around the arc.

17. A process of electric arc welding with an open arc which comprises the steps of supplying an alternating electric current at commercial frequency and in the order of at least 500 amperes to a continuous consumable cored electrode connected in series with an inductive reactance to develop an arc between the said electrode and an article being welded, said inductive reactance being the major element affecting the application of electrical power from the alternating current source to the arc and being of sufficient reactance to cause the current flowing through the arc to lag the *applied* voltage [applied between the electrode and the article] by an amount sufficient to establish a sufficient open circuit voltage across the arc when the current is essentially zero to reestablish the arc immediately after current reversal solely under promotion of the available open circuit voltage and the action of ionizing agent present in the core material of the electrode, adjusting the reactance to adjust the phase angle between the voltage and the current to an amount sufficient to create and maintain a stabilized arc, employing an electrode comprising a tubular metallic sheath and core material contained therein in the amount of from 12 to 18 percent by weight of the total weight of the electrode and including an ionizing agent as an essential ingredient, the core material consisting of 4 to 17 parts by weight of cesium carbonate, 17 to 35 parts by weight of titanium dioxide, 20 to 40 parts by weight of ferromanganese, 5 to 15 parts by weight of ferrosilicon, a trace to 10 parts by weight of ferrozirconium, and a trace to 30 parts by weight of iron oxide, feeding the electrode toward the article being welded at a rate sufficient to maintain continuous welding at the arc and simultaneously causing relative motion between [an] *the* arc and the electrode along a desired line of weld, and directing an inert air excluding shield of gas toward the article and around the arc.

References Cited

The following references, cited by the Examiner, are of record in the patented file of this patent or the original patent.

UNITED STATES PATENTS

| | | | |
|---|---|---|---|
| 2,694,764 | 11/1954 | Muller | 219—146 X |
| 2,909,778 | 10/1959 | Landis et al. | 219—146 X |
| 2,951,931 | 9/1960 | Danhier | 219—74 |
| 3,051,822 | 8/1962 | Bernard et al. | 219—74 |
| 3,117,215 | 1/1964 | Ramsey | 219—131 |

RICHARD M. WOOD, *Primary Examiner.*

J. G. SMITH, *Assistant Examiner.*

U.S. Cl. X.R.

219—146